United States Patent
Piller et al.

[11] 3,785,827
[45] Jan. 15, 1974

[54] PHOTOGRAPHIC MATERIAL STABILISED AGAINST ULTRAVIOLET RADIATION

[75] Inventors: Bernhard Piller, Marly-le-Petit; Max Meier, Fribourg; Max Duennenberger, Frenkendorf; Hans Rudolf Biland, Gelterkinden; Christian Luethi, Muenchenstein, all of Switzerland

[73] Assignee: Ciba-Geigy AG, Basil, Switzerland

[22] Filed: Mar. 10, 1971

[21] Appl. No.: 123,018

[30] Foreign Application Priority Data
Mar. 11, 1970  Switzerland.......................... 3643/70

[52] U.S. Cl.................................. 96/84 R, 252/300
[51] Int. Cl.................................. G03c 1/84
[58] Field of Search.......................... 96/84; 252/300

[56] References Cited
UNITED STATES PATENTS
| | | | |
|---|---|---|---|
| 2,568,894 | 9/1951 | Mackey | 252/300 |
| 3,249,435 | 5/1966 | Rogers | 96/84 |
| 3,330,680 | 7/1967 | Haas | 96/84 |
| 2,875,053 | 2/1959 | Minsk | 96/84 |
| 3,120,564 | 2/1964 | Milionis et al. | 252/300 |
| 3,215,530 | 11/1965 | Riebel et al. | 96/84 |
| 3,200,086 | 8/1965 | Coleman | 260/2 |
| 2,773,903 | 12/1956 | Hardy et al. | 260/591 |
| 3,698,907 | 10/1972 | Sato et al. | 96/84 R |

FOREIGN PATENTS OR APPLICATIONS
| | | | |
|---|---|---|---|
| 1,120,122 | 7/1968 | Great Britain | 96/84 |
| 1,248,554 | 11/1960 | France | 96/84 |

*Primary Examiner*—Ronald H. Smith
*Attorney*—Harry Goldsmith, Joseph G. Kolodny and Mario A. Monaco

[57] ABSTRACT

This invention relates to colour photographic material. Said material is stabilized by means of a 2-hydroxybenzophenone which is free from sulphonic acid groups and which corresponds to the formula

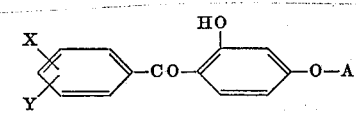

wherein X represents a hydrogen or halogen atom, a possibly substituted alkyl, alkenyl or phenyl group, an alkylcarbonyl or alkylsulfonyl group or an A'-O group, Y represents a hydrogen or halogen atom, a possibly substituted alkyl group or an A''-O group, A, A' and A'' each representing a hydrogen atom, a possibly substituted alkyl, alkenyl, cycloalkyl, aralkyl or phenyl group or a residue of the formula $$-CO - (NH)_{n-1} - D$$

wherein D represents an alkyl, alkenyl or possibly substituted phenyl residue and $n$ is one or two.

4 Claims, No Drawings

PHOTOGRAPHIC MATERIAL STABILISED AGAINST ULTRAVIOLET RADIATION

This invention relates to photographic material which contains a 2-hydroxybenzophenone derivative as an agent for stabilising the photographic material against the deleterious effects of ultra-violet radiation.

According to the present invention there is provided colour photographic material, characterised in that it contains on a carrier, in at least one layer a stabilising agent against ultra-violet radiation which is a 2-hydroxybenzophenone free from sulphonic acid groups of formula (1) 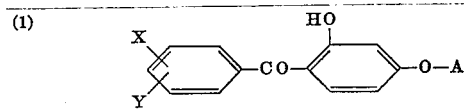

wherein X is a hydrogen or halogen atom, a possibly substituted alkyl, alkenyl or phenyl group, an alkylcarbonyl, (alkyl -CO-) or alkylsulfonyl group (alkyl-$SO_2$-) or an A'-O group, Y is a hydrogen or halogen atom, a possibly substituted alkyl group or an A''-O group, A, A' and A'' each representing a hydrogen atom, a possibly substituted alkyl, alkenyl, cycloalkyl, aralkyl or phenyl group or a residue of the formula $$-CO-(NH)_{n-1}-D$$

(1a)

wherein D represents an alkyl or possibly substituted phenyl residue and $n$ is one or two.

Of particular interest for the purposes of the present invention are the 2-hydroxybenzophenones of formula (2) 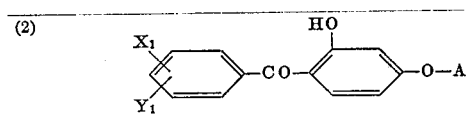

wherein $X_1$ is a hydrogen or halogen atom, an alkyl, alkoxy or phenyl group, $Y_1$ is a hydrogen or halogen atom, an alkyl or alkoxy group and A has the meaning specified above.

Substituent groups optionally present in X, Y, A, A', A'' or D are for example, alkyl, alkoxy, hydroxyl or nitro groups or halogen atoms, such as iodine, bromine or, in particular, chlorine.

Preferably the 2-hydroxybenzophenone is of the formula (3) 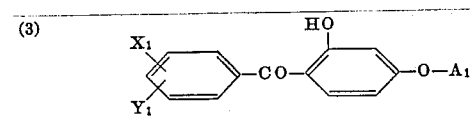

wherein $A_1$ represents a hydrogen atom, a possibly further substituted alkyl residue, a cycloalkyl residue or a residue of formula $$-CO-(NH)_{n-1}-D_1$$

(3a)

wherein $D_1$ represents an alkyl, alkenyl, phenyl, alkylphenyl, hydroxyphenyl, alkoxyphenyl or halo-phenyl residue and $n$ equals one or two, and $X_1$ and $Y_1$ have the specified meaning, or in particular of formula (4) 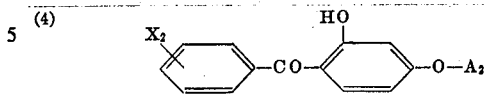

wherein $X_2$ represents a hydrogen or chlorine atom, an alkyl or alkoxy group with one to four carbon atoms or a phenyl group and $A_2$ a hydrogen atom, a possibly substituted alkyl group with one to 18 carbon atoms, a cycloalkyl group with five or six ring members or a residue of formula $$-CO-(NH)_{n-1}-D_2$$

(4a)

wherein $D_2$ represents an alkyl residue with one to 18 carbon atoms, an alkenyl residue with two to four carbon atoms or a residue of formula (4b) 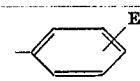

where E refers to a hydrogen atom, an alkyl residue with one to four carbon atoms, an alkoxy group with one to eight carbon atoms, a hydroxy group or a halogen atom, and $n$ equals one or two.

Possible substituents for an alkyl group $A_2$, are the same residues as are specified for A. Where $A_2$ represents a cycloalkyl group, this is generally a cyclopentyl or preferably cyclohexyl residue. If the residue E refers to a halogen atom, this is preferably an iodine, bromine or, in particular, a chlorine atom.

Of particular advantage are 2-hydroxybenzophenones of formula (5) 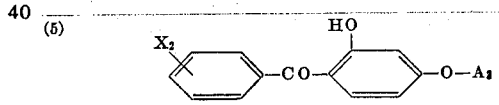

where $A_3$ is an alkyl residue possibly substituted with one or two carboxyl or alkoxy carbonyl groups, with one to 18 carbon atoms, the alkoxy group having one to 18 carbon atoms or being a cyclohexyl residue and $X_2$ has the meaning specified above.

Good results are obtained in particular also with 2-hydroxybenzophenones of formula (6) 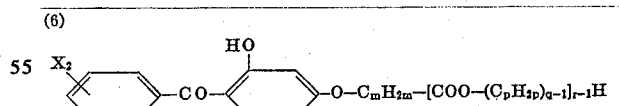

wherein $m$ and $p$ represent integers of a value of one to 22 and $a$ and $r$ are each one or two, and $X_2$ has the meaning specified above.

Alkyl ethers of 2-hydroxybenzophenones correspond preferably to formula (7) 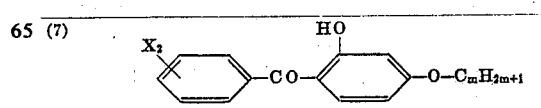

wherein $X_2$ and $m$ have the meaning specified above.

Carboxylic acids of the 2-hydroxybenzophenones correspond preferably to formula (8) 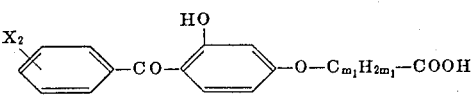

or especially formula (9) 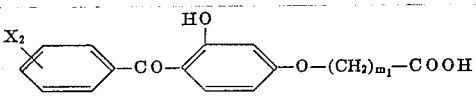

wherein $m_1$ is an integer of a value of one to 10 and $X_2$ has the specified meaning.

Carboxylic acid esters of the 2-hydroxybenzophenones correspond preferably to formula

(10) 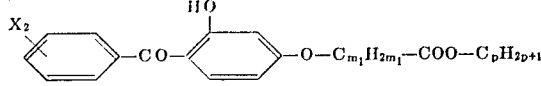

or in particular formula

(11) 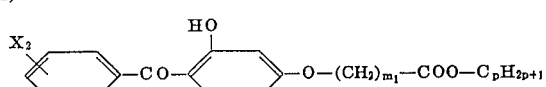

wherein $X_2$, $m_1$ and $p$ have the specified meaning.

In Formulae (6), (10) and (11) $p$ represents preferably an integer of a value of one to four.

The 2-hydroxybenzophenones to be used according to the invention are known and can be manufactured according to known methods.

From French Pat. No. 1,248,554, for instance 2-hydroxybenzophenones of formula

(12) 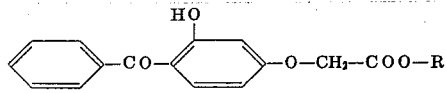

are known, wherein R represents an alkyl residue, such as for instance an n-hexyl, n-octyl, n-dodecyl or n-octadecyl residue as stabilisers in plastics, especially poly-60-olefines.

From the publication of the Japanese Pat. application Ser. No. 62583/64, further 2-hydroxybenzophenones are known, namely as stabilisers in polyolefines, for instance
2-hydroxy-4-(10'-carbomethoxydecaoxy)-benzophenone,
2-hydroxy-4-(10'-carboethoxydecaoxy)-benzophenone,
2-hydroxy-4-(10'-carbobutoxydecaoxy)-benzophenone,
2-hydroxy-4-(2'-carbooctoxyethoxy)-benzophenone,
2-hydroxy-4-(2'-carbododecaoxy-ethoxy)-benzophenone,
2-hydroxy-4-(10'-acetyldecaoxy)-benzophenone,
2-hydroxy-4-(10'-butyloyldecaoxy)-benzophenone,
2-hydroxy-4-(2'-dodecanoyl-ethoxy)-benzophenone,
2-hydroxy-4-(10'butylthiocarbonyldecaoxy)-benzophenone,
2-hydroxy-4-(2'-dodecathiocarbonylethoxy)-benzophenone,
2-hydroxy-4-(2'-dodecathioethoxy)-benzophenone,
2-hydroxy-4-(10'-butylthiodecaoxy)-benzophenone,
2-hydroxy-4-(10'butylsulfinyldecaoxy)-benzophenone,
2-hydroxy-4-(10'-butylsulfonyldecaoxy)-benzophenone, Furthermore, in the U.S. Pat. No. 3,200,086, 2-hydroxybenzophenones of formula

(13) 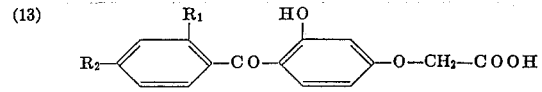

are described, wherein $R_1$ represents a hydrogen atom or a hydroxyl group and $R_2$ a hydrogen atom or a carboxymethoxy- group, as stabilisers against ultra-violet radiation, chemically bonded in polymerisations.

In the U.S. Pat. No. 2,773,903, 2-hydroxybenzophenones such as for instance
2,2'-dihydroxy-4,4'-dimethoxybenzophenone,
2,2'-dihydroxy-4-methoxy-4'-ethoxybenzophenone,
2,2'-dihydroxy-4-butoxy-4'-methoxybenzophenone,
2-hydroxy-4-methoxy-4'-ethoxybenzophenone,
2-hydroxy-4'-methoxy-4'-chlorobenzophenone,
2-hydroxy-4-methoxy-benzophenone and
2-hydroxy-4-methoxy-4'-methylbenzophenone
are described as ultra-violet absorbers in plastics.

Other light protective agents against ultra-violet radiation, such as for instance 2,4-dihydroxy-4'-phenolbenzophenone or 2-hydroxy-4-methoxy-4'-phenyl-benzophenone are known from the German Pat. No. 1,093,373.

2-hydroxy-4'-methoxybenzophenone and 2,2'-dihydroxy-4-methoxybenzophenone are described in the German Pat. No. 1,093,374 as stabilisers for synthetic resins against the effect of ultra-violet radiation.

As light protective agent in synthetic resins, especially in unsaturated polyesters, the French Pat. No. 1,098,344 mentions benzophenones of the general formula

(14) 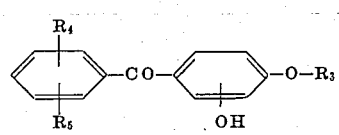

wherein $R_3$ is an alkyl group with one to four carbon atoms, $R_4$ an alkyl group with one to four carbon atoms, a hydrogen or halogen atom, and $R_5$ is an alkyl or alkoxy group with one to four carbon atoms, a hydrogen or halogen atom. To this belong amongst others the 2-hydroxy-4,4',5'-trimethoxybenzophenone, the 2-hydroxy-4-n-butoxybenzophenone, the 2-hydroxy-4-methoxy-4'-tert.butylbenzophenone, the 2-hydroxy-4-ethoxy-4'-propylbenzophenone and the 2-hydroxy-4-methoxy-2'-chlorobenzophenone.

The French Pat. No. 1,256,112 describes the 2-hydroxy-4-carboxymethoxybenzophenone and the 2-hydroxy-4-carboxymethoxy-4'-methoxybenzophenone as initial product for the manufacture of stabilisers in plastics by conversion with multivalent alcohols.

Other 2-hydroxybenzophenones to be used according to the invention are, for instance, the
2-hydroxy-4-carboxymethoxy-4'-phenylbenzophenone,
2-hydroxy-4-carboxy-n-decoxy-4'-phenylbenzophenone,
2-hydroxy-4-carboxy-n-pentoxy-4'-phenylbenzophenone,
2-hydroxy-4-ethoxy-carbonyl-n-decoxy-4'-phenylbenzophenone,
2-hydroxy-4-ethoxy-carbonyl-n-pentoxy-4'-phenylbenzophenone,
2-hydroxy-4-/2'',3''-di-(ethoxy-carbonyl)-propoxy/-4'-phenyl-benzophenone.

The German Pat. No. 1,468,202 described so-called $p$-terphenylketones as protective agents against ultraviolet radiation. Other 2-hydroxybenzophenones which can be used according to the invention correspond, for instance, to the following formulae:

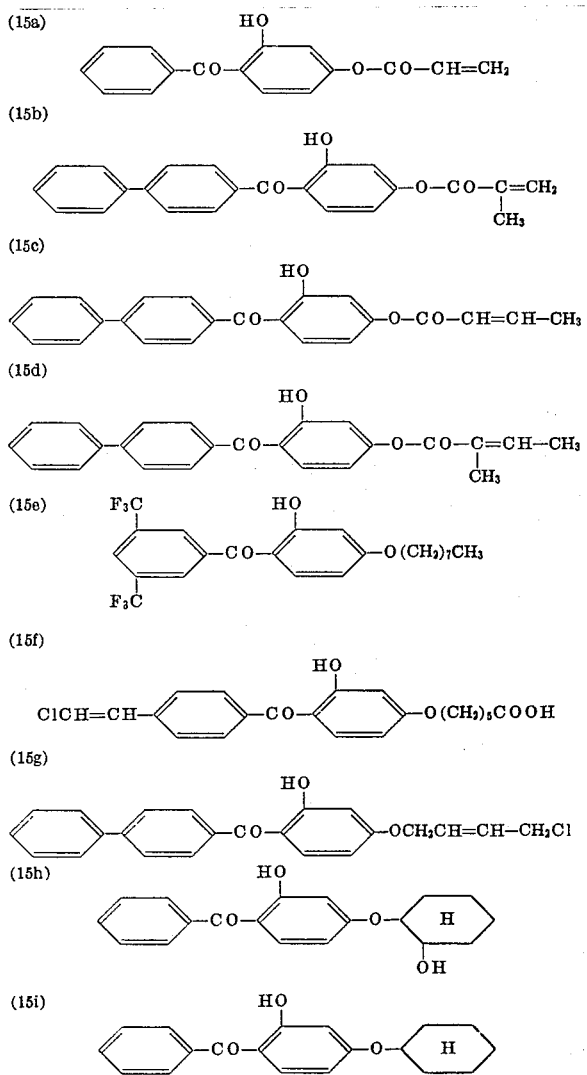

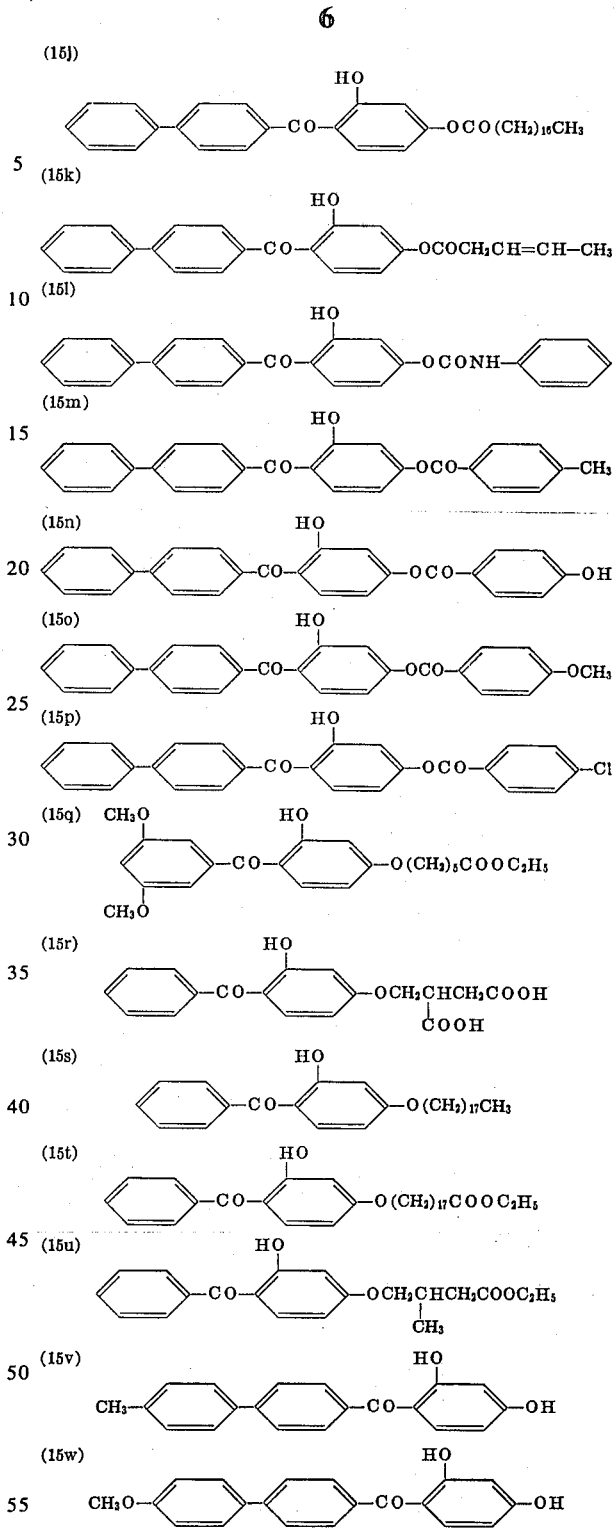

Compounds of this type, which are in accordance with the general formula

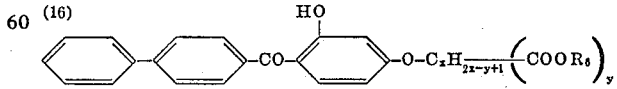

wherein $x$ is an integer of a value from one to 18, $y$ equals one or two and $R_6$ a hydrogen atom, a cycloalkyl, alkenyl, possibly substituted alkyl or possibly substituted phenyl residue, can be made according to the known methods, for instance by conversion of the corresponding 2,4-di-hydroxybenzophenone with the corresponding alcohol. By re-esterification of esters, which do not correspond to formula (16) or esterification of free acids according to formula (16) esters of Formula (16) are also obtained.

Compounds especially suitable for use according to the invention are listed in the following Table I.

(17) 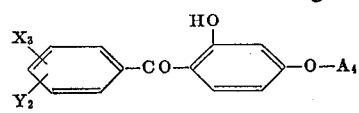

TABLE I

| Formula number | $X_3$ | $Y_2$ | $A_4$ | Melting point in °C. | Absorption maximum in dimethyl formamide in /nm./ |
|---|---|---|---|---|---|
| 101 | H | H | $(CH_2)_7CH_3$ | 50 | 296+325 |
| 102 | 4-⌬ | H | H | 188 | 296+329 |
| 103 | Same as above | H | $C(CH_3)_3$ | 80 | 300+326 |
| 104 | do | H | $(CH_2)_5CH_3$ | 89 | 298+332 |
| 105 | do | H | $(CH_2)_7CH_3$ | 67 | 291+330 |
| 106 | do | H | $(CH_2)_9CH_3$ | 82 | 295+330 |
| 107 | do | H | $(CH_2)_{15}CH_3$ | 88 | 296+329 |
| 201 | H | H | $(CH_2)_{10}COOH$ | 85 | *292+324 |
| 202 | 4-⌬ | H | $(CH_2)_{10}COOH$ | 130 | *295+333 |
| 203 | H | H | $CH_2COOH$ | 204 | *300+330 |
| 204 | H | H | $(CH_2)_5COOH$ | 124 | *298+326 |
| 205 | 2-OH | 4-OCH$_2$COOH | $CH_2COOH$ | 248 | *241+336 |
| 108 | H | H | H | 145 | 295+325 |
| 109 | 4-C(CH$_3$)$_3$ | H | H | 162 | 297+325 |
| 110 | 4-OCH$_3$ | H | H | 163 | 300+328 |
| 111 | 4-Cl | H | H | 152 | 297+326 |
| 112 | 4-SO$_2$CH$_3$ | H | H | 202 | 297+330 |
| 113 | 4-OH | 2-OH | H | 201 | 290+336 |
| 114 | 4-Cl | 3-Cl | H | 186 | 297+328 |
| 115 | 3-CH$_3$ | 5-CH$_3$ | H | 158 | 296+325 |
| 116 | H | H | $CH_2$-⌬-$NO_2$ | 172 | 293+325 |
| 117 | 4-C(CH$_3$)$_3$ | H | $(CH_2)_7CH_3$ | Liquid | 294+326 |
| 118 | 4-OCH$_3$ | H | $(CH_2)_7CH_3$ | 55 | 298+330 |
| 119 | 4-Cl | H | $(CH_2)_7CH_3$ | 60 | 295+325 |
| 120 | 4-Cl | 3-Cl | $(CH_2)_7CH_3$ | 51 | 296+325 |
| 121 | 4-⌬ | H | $CH(CH_2CH_2CH_3)_2$ | Liquid | 298+330 |
| 122 | Same as above | H | $CH_2CH=CH-CH_3$ | 117 | 299+330 |
| 123 | do | H | $(CH_2)_3OH$ | 145 | 298+330 |
| 124 | do | H | -⌬-$NO_2$ | 234 | 300 |
| 125 | do | H | -⌬-$NH_2$ | 163 | 298+335 |
| 126 | do | H | -⌬-NH-CO-⌬-COOCH$_3$ | 300 | 297+330 |
| 127 | 2-COCH$_3$ | H | H | 184 | 281+286 |
| 128 | 4-⌬-$NO_2$ | H | H | 299 | 305+330 |
| 129 | 4-⌬ | H | ⌬H | 123 | 300+330 |
| 301 | H | H | $(CH_2)_{10}COOC_2H_5$ | 54 | 292+324 |
| 302 | 4-⌬ | H | $(CH_2)_5COOC_2H_5$ | 69 | 296+330 |
| 303 | Same as above | H | $(CH_2)_{10}COOC_2H_5$ | 82 | 296+335 |
| 304 | 4-OCH$_2$COOC$_2$H$_5$ | 2-OH | $CH_2COOC_2H_5$ | 139 | 287+328 |
| 305 | 4-⌬ | H | $(CH_2)_5COCH_2CH-C_2H_5$ $\|$ $(CH_2)_3CH_3$ | Liquid | 297+330 |
| 306 | Same as above | H | $CH_2CHCH_2COOC_2H_5$ $\|$ $COOC_2H_5$ | 77 | 295+334 |

TABLE I – Continued

| Formula number | $X_3$ | $Y_2$ | $A_1$ | Melting point in °C. | Absorption maximum in dimethyl formamide in /nm./ |
|---|---|---|---|---|---|
| 307 | do | H | $CH_2COOC_2H_5$ | 133 | 297+330 |
| 308 | do | H | $CH_2COO(CH_2)_{17}CH_3$ | 95 | 295+328 |
| 309 | do | H | $CH_2COO(CH_2)_{21}CH_3$ | 99 | 295+330 |
| 310 | do | H | $CH_2COOCH_2CH_2OH$ | 179 | 296+330 |
| 311 | do | H | $CH_2COOCH_2CH_2OC_2H_5$ | 92 | 300+325 |
| 312 | do | H | $CH_2COOCH_2CH_2Cl$ | 174 | 293+328 |
| 313 | do | H | $CH_2COO(CH_2)_3Cl$ | 162 | 295+330 |
| 314 | do | H | $CH_2COO-\langle C_6H_{10} \rangle$ | 79 / 114 | 296+329 / 296+330 |
| 315 | do | H | $CH_2COOCH_2CH=CH-CH_3$ | | |
| 316 | do | H | $CH_2COOCH_2CH_2OOCCH_2$ (biphenyl-OC-phenyl(OH)-O-) | 183 | 297+330 |
| 317 | do | H | $CH_2COO-\langle C_6H_5 \rangle$ | 105 | 300+328 |
| 318 | do | H | $CH_2COO-\langle C_6H_4 \rangle-CH_3$ | 167 | 296+325 |
| 319 | do | H | $CH_2COO-\langle C_6H_4 \rangle-OCH_3$ | 166 | 295+330 |
| 320 | do | H | $CH_2COO-\langle C_6H_4 \rangle-Cl$ | 198 | 296+325 |
| 321 | do | H | $OC-CH_3$ | 108 | 298+329 |
| 322 | do | H | $OC-NH-C_2H_5$ | 159 | 298+325 |
| 323 | do | H | $CH_2COO(CH_2)_5CH_2$ | 92 | 297+330 |

\* DMF plus $H_2O$; 1:1.

The material for colour photography, which according to the invention is stabilised against the effect of ultra-violet radiation can be treated when partially or totally unexposed or exposed. Preferably unexposed, or exposed and fixed, material for colour photography is stabilised against ultra-violet radiation. For this purpose it may be material for processing by colour transfer methods or preferably, material for processing by chromogenic and silver dye-bleaching methods, or material already processed by said methods.

The compounds to be used in accordance with the invention, or mixtures thereof, may be incorporated in some form either into emulsions containing the dyestuff or dyestuff components, or into coloured or colourless intermediate backing and/or covering emulsions containing possibly other components.

The compounds to be used in accordance with the invention can be incorporated into or applied on to the photographic material during the manufacture of the material, for instance by including in the required emulsion or before, during or after the photographic processing, for instance for applying the compound per se, applying it with the aid of bonding agent, for instance by spraying it with a protective varnish, or by diffusing it from a solution, suspension or emulsion.

The following methods of incorporating the compounds of formula (1) are possible:

1. Incorporation into the emulsion binding agent, for instance in gelatin or other usual emulsion binding agents, such as photographic varnishes which may consist for instance of ethyl or acetyl cellulose.
   1.1. Molecular dispersed solution in binding agent.
   1.2. In form of associates distributed in the binding agent.
   1.3. Deposited on the binding agent.
   1.4. Co-polymerized with the binding agent or a derivative thereof.
   1.5. Reactively inter-linked with the binding agent or inoculated as preliminary polymerisate on the emulsion forming polymer.
   1.6. Dispersed in fine distribution in the binding agent. For this purpose the usual dispersing methods, such as controlled precipitation from a liquid or dissolved consistency, grinding or emulsification of a component solution in a liquid not miscible with the binding agent or the binding agent solution and subsequent removal of it by a washing or evaporation process, may be used. For this purpose the known techniques for the preparation of dispersions are applied, such as for instance the use of dispersing agent, use of protective colloids, dispersing mixers, flow chambers and the like.
   1.7. Emulsified in the binding agent in finely distributed form as liquid.
2. Incorporation into an auxiliary substrate analogously to 1.1. to 1.7., which is subsequently dissolved in the binding agent in some form, polymerised, or reactively inter-linked with it. The following are, for instance, suitable substrates: Water soluble polymerisates on an acrylic acid and vinylpyrrolidone basis, polyvinyl alcohols, gelatin derivatives, e.g., by reactive interlinking with triazine derivatives, modified gelatin, starch, polyamides, polyacrylonitrile solvents of low volatility, such as esters of dicarbonic acid, diethyl lauric amide, tricresylphosphate and the like.
3. Incorporation into the layer-substances for instance cellulose triacetate, polyester, polycarbonate, preferably in molecularly dispersed solutions.

The compounds, according to the invention, are outstanding for suitable spectral absorption, good diffusion, the property high light fastness, excellent protective action against ultra-violet radiation, suitable rheological properties in mixtures with gelatin and especially by excellent solubility in water [compounds of formula (9) ] or in dibutylphthalate [compounds of formulae (7) and (11) ].

Compounds especially solubie in dibutylphthalate are listed in the following Table II.

TABLE II

| Formula No. according to Table I | Solubility in dibutylphthalate in percents by weight (g / 100 g of mixture) |
|---|---|
| 101 | 50 |
| 105 | 25 |
| 117 | 40 |
| 118 | 50 |
| 119 | 30 |
| 121 | >50 |
| 301 | 20 |
| 302 | 30 |
| 308 | 30 |
| 311 | 25 |

The following Examples will serve to illustrate the invention.

EXAMPLE 1

90 g of the compound of formula (105) are dissolved over a water bath in 110 g of dibutylphthalate. This solution is subsequently dispersed and thinned in a mixture of 200 g of an aqueous eight per cent solution of sodium alkyl naphthalene sulphonate and 1,600 g of a 12.5 percent gelatin solution in a colloidal mill.

Subsequently, the dispersion is poured on to a transparent cellulose triacetate strip in such a manner that after drying the film thus prepared has an optical density of 1.5 for light at 350 nm wavelength.

The strip is then treated with a commercially available p-methylaminophenyl-sulphate-hydroquinone developer for 6 minutes. Subsequently, it is immersed for 4 minutes in a stop fixing bath of the following composition:

Ammonium thiosulphate —200 g
Sodium sulphite —15 g
Sodium acetate-trihydrate —25 g
Glacial acetic acid —13 g
Water — to make up 1,000 ml.

After washing for 2 minutes the strip is treated for 6 minutes with a solution of the following composition:

Hydrochloric acid, 37 percent —70 ml.
Potassium bromide —50 g
Thiourea —80 g
2-amino-3-hydroxyphenazine —5 g
Water —to make up 1,000 ml.

Subsequently, the strip is washed for 2 minutes and then immersed into a silver bleaching bath of the following composition:

Potassium-iron(III)-cyanide —75 g
Calcium bromide —15 g
Primary sodium phosphate-monohydrate —10 g
Sodium acetate-trihydrate —5 g
Glacial acetic acid —10 g
Water —to make up 1,000 ml.

After 2 minutes the strip is washed for 2 minutes and again treated for 4 minutes with the above-described stop fixing bath. Subsequently, the strip is washed and dried. After the above-described photographic processing, the optical density of the strip is unchanged at 1.5 for light of 350 nm wavelength.

Similar results are obtained when using one of the compounds of formulae (101), (103), (104), (106), (107), (116) to (126), (129) or (301) to (323) as listed in Table I.

EXAMPLE 2

3.3 ml of a 6 percent aqueous gelatin solution, 2.0 ml 1 percent aqueous solution of hardener of formula:

(401)

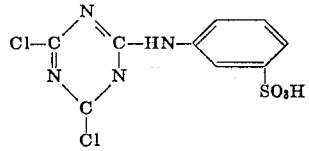

and 2.0 ml 1 percent solution of the product of formula (202) are added with a pipette to a mixture of ethanol and 30 percent caustic soda solution in a test tube and supplemented with deionized water to 10.0 ml. This solution is thoroughly mixed and kept at 40° C for 5 minutes on a water bath.

The casting solution at 40° C is poured on to a 13 cm x 18 cm substrated glass plate. After setting at 10° C the plate is dried in a drying cabinet at ambient atmosphere of 32° C. The optical density of the filter thus produced is 1.0 for light of 350 nm wavelength.

After processing according to Example 1 the optical density remains unchanged.

Instead of the compound of formula (202) one of the compounds of formula (201) or (203) to (205) according to the invention can be used.

EXAMPLE 3

0.1 g of the compound of formula (102) is dissolved whilst heating in 10 ml of ethanol, adjusted alkaline with 1n-sodium hydroxide solution and diluted with water to 20 ml.

1 ml of this solution is mixed, using an ultrasonic equipment, with 6.6 ml 6 percent gelatin solution, adjusted to pH 9.4. After adding 3.4 ml of ethanol and 1.0 ml of a 1 percent aqueous solution of the hardener of formula (401), the pH value is adjusted to 5.5 with 1n-hydrochloric acid. The mixture is then poured, as described in Example 2, on to a 13 cm × 18 cm substrated glass plate and dried. An optical density of 1.0 for light at 350 nm wavelength is obtained which, when the plate is treated according to Example 1, remains unchanged.

Instead of the compound of formula (102) one of the compounds of formulae (108) to (115), (127) or (128) of Table I, according to the invention, can be used.

EXAMPLE 4

9 mg of the compound of formula (117) are mixed in the ultrasonic equipment with 6.6 ml of 6 percent aqueous gelatin solution. 1.0 ml of a 1 percent aqueous solution of hardener of formula (401) is added and supplemented with deionized water to 10.0 ml.

The mixture is then poured as specified in Example 2 on to a 13 cm × 18 cm substrated glass plate and dried. An optical density of 1.0 for light of 350 nm wavelength is obtained, which when the plate is treated according to Example 1 remains unchanged.

Instead of the compound of formula (117) one of the compounds of formulae (121) or (305) according to the invention can be used.

EXAMPLE 5

A red sensitive silver bromide emulsion, containing the blue-green dyestuff of formula:

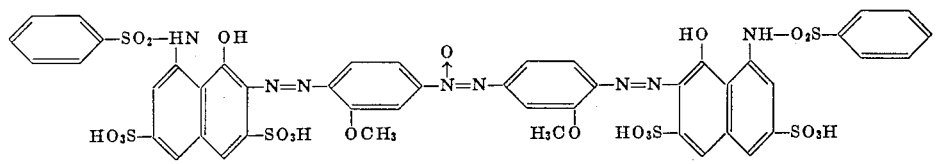

(402)

is cast on to a transparent carrier.

Strips of the light sensitive material thus produced, are cut and a layer is applied to them using a dispersion as described in Examples 1 to 4. On to one strip, serving as reference specimen, a gelatin solution only is applied.

After the photographic processing described in Example 1, all the strips have the same colour density measured with red light.

The strips are then exposed for 150 hours to a xenon lamp. A comparison of the optical density prior and subsequent to this exposure provides a parameter for the improvement of the light fastness due to the applied protective coat. The results are listed in Table III.

Instead of the compounds listed in Table III, it is possible also to use one of the compounds listed in Table I.

Similar results are obtained when also using other dyestuffs usual in silver dye-bleaching, colour transfer or chromogenic photography.

and on a carrier in such a manner that the protective layer at 350 nm has an optical density of 1.0. In the case of the CIBA photographic varnish, this corresponds to a layer thickness of approximately 20 $\mu$.

After 150 hours exposure with a xenon lamp there results a protective effect of 53 percent, calculated according to Example 5, compared with a varnish layer not containing any stabilizer.

Similar results are obtained when using one of the other compounds listed in Table I of formula (101), (103), (104), (106), (107), (116) to (126), (129) or (301) to (323).

EXAMPLE 7

A gelatin layer on carrier and containing the dyestuff of formula (402) in a maximum density of 1.00 is immersed into an 0.3 percent aqueous solution of compound (201), until the optical density of the stabilizer diffused into the gelatin is 1.00 at 350 nm.

After drying, exposure follows with a xenon lamp for 150 hours. The protective effect, calculated according to Example 5, is 40 percent compared to a specimen without stabilizer.

A similar result is obtained with the compound, according to formula (204) of Table I.

EXAMPLE 8

Ektachrome daylight transparent material, partially exposed with white light and developed in the usual

TABLE III

| Protective layer according to Example No. | With compound of Formula No. | $D_{max}$ of the dye-stuff prior to exposure | $D_{max}$ of the dye-stuff after exposure | $-D_{max}$ (reduction of $D_{max}$) in % | Improvement of light fastness in %: $1-(\Delta D_{max}\%/48\%)$ |
|---|---|---|---|---|---|
| * | * | 1,00 | 0,52 | 48 | * |
| 1 | 101 | 1,00 | 0,85 | 15 | 69 |
| 1 | 105 | 1,00 | 0,75 | 25 | 48 |
| 1 | 121 | 1,00 | 0,88 | 12 | 75 |
| 1 | 302 | 1,00 | 0,89 | 11 | 77 |
| 2 | 201 | 1,00 | 0,73 | 27 | 44 |
| 2 | 202 | 1,00 | 0.72 | 28 | 42 |
| 2 | 204 | 1,00 | 0,93 | 7 | 85 |
| 3 | 102 | 1,00 | 0,78 | 22 | 54 |
| 4 | 117 | 1,00 | 0,87 | 13 | 73 |

*Reference specimen (gelatin without stabilizer)

EXAMPLE 6

0.2 g of the compound of formula (105) are dissolved in 100 ml of a commercially used photographic varnish, for instance, "CIBA photovarnish". This mixture is applied on to a gelatin layer containing the dyestuff of formula (402) in a maximum density of 1.00, hardened manner, is provided with a protective coat containing the compound of formula (202) (test specimen). A similar compounded specimen containing the compound of formula (202), but not containing the specimen, is used for comparison, (zero specimen). Subsequently, the two specimens are irradiated for 48 hours with a xenon lamp. Prior and subsequent to irradiation the filter densities are measured for red, green and blue light (R, G and B) with a GRETAG D 33 densitometer. The results are compiled in Table IV.

TABLE IV

| Filter density | prior to irradiation | Test specimen | B : 1.60<br>G : 1.66<br>R : 1.42 |
| --- | --- | --- | --- |
| | | Zero specimen | B : 1.61<br>G : 1.65<br>R : 1.42 |
| | subsequent to irradiation | Test specimen | B : 1.26<br>G : 1.56<br>R : 1.25 |
| | | Zero specimen | B : 1.25<br>G : 1.52<br>R : 1.24 |
| Improvement of light fastness due to the Compound of Formula (202) according to the Formula: | | | B : 5%<br>G : 24%<br>R : 6% |

$$1 - \frac{\Delta D \text{ in \% of the test specimen}}{\Delta D \text{ in \% of the zero specimen}}$$

We claim:

1. A light sensitive color photographic silver dye bleach material which comprises on a carrier in at least one layer, as a stabilizing agent against the effects of ultraviolet radiation, a 2-hydroxybenzophenone selected from the group consisting of

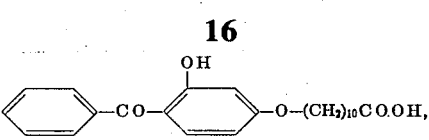

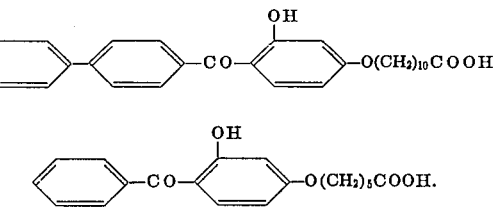

and

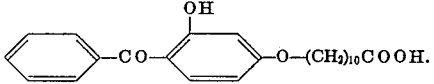

2. Material according to claim 1, wherein the 2-hydroxy-benzophenone is

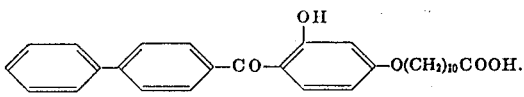

3. Material according to claim 1, wherein the 2-hydroxy-benzophenone is

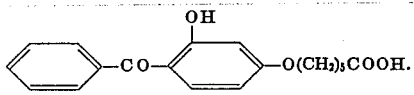

4. Material according to claim 1, wherein the 2-hydroxy-benzophenone is

* * * * *